United States Patent [19]
Reimann et al.

[11] 3,883,507
[45] May 13, 1975

[54] NOVEL ESTERS OF MEGALOMICIN A AND PROCESSES FOR THEIR PREPARATION

[75] Inventors: Hans Reimann, Wayne; Robert S. Jaret, Livingston, both of N.J.

[73] Assignee: Schering Corporation, Kenilworth, N.J.

[22] Filed: Mar. 28, 1974

[21] Appl. No.: 455,751

Related U.S. Application Data

[63] Continuation-in-part of Ser. No. 109,632, Jan. 25, 1971, abandoned.

[52] U.S. Cl. ........ 260/210 AB; 260/210 R; 424/181
[51] Int. Cl. ............................................. C07c 129/18
[58] Field of Search................... 260/210 AB, 210 R

[56] References Cited
UNITED STATES PATENTS

| | | | |
|---|---|---|---|
| 3,318,866 | 5/1967 | Hoeksema | 260/210 R |
| 3,326,891 | 6/1967 | Hoeksema | 260/210 R |
| 3,455,900 | 7/1969 | Birkenmeyer et al. | 260/210 R |
| 3,632,750 | 1/1972 | Weinstein et al. | 260/210 R |
| 3,634,393 | 1/1972 | Motola | 260/210 R |

Primary Examiner—Johnnie R. Brown
Attorney, Agent, or Firm—Mary S. King

[57] ABSTRACT

Novel 3',4',2'',4'''-tetraacylmegalomicin A, 3',4',4'''-triacylmegalomicin A, 3',4',2''-triacylmegalomicin A, and 3',4'-diacylmegalomicin A ester derivatives have antibiotic activity. The 3',4',2'',4'''-tetraacylmegalomicin A esters are prepared by treating megalomicin A or a secondary ester derivative thereof having a 3'-hydroxy group, with an excess of hydrocarbon carboxylic acid anhydride in a basic solvent at elevated temperatures. The 3',4',4'''-triacylmegalomicin A esters are prepared by subjecting 3',4',2'',4'''-tetraacylmegalomicin A to mild hydrolytic conditions. The 3',4',2''-triacylmegalomicin A esters are prepared by treating 3',4'-diacylmegalomicin A with approximately a molar equivalent of hydrocarbon carboxylic acid anhydride in acetone. The 3',4'-diacylmegalomicin A esters are prepared by subjecting to mild hydrolytic conditions a member selected from the group consisting of 3',4',2'',4'''-tetraacylmegalomicin A, 3',4',4'''-triacylmegalomicin A, and 3',4',2''-triacylmegalomicin A.

15 Claims, No Drawings

NOVEL ESTERS OF MEGALOMICIN A AND PROCESSES FOR THEIR PREPARATION

CROSS REFERENCE TO RELATED APPLICATIONS

This application is a continuation-in-part of our co-pending application Ser. No. 109,632, filed Jan. 25, 1971, and now abandoned.

FIELD OF INVENTION

This invention relates to novel processes and to novel compositions of matter produced thereby.

More specifically, this invention relates to methods for the preparation of tertiary esters of megalomicin A, and to the novel tertiary esters of megalomicin A produced thereby together with their pharmaceutically acceptable acid addition salts which exhibit antibiotic activity.

DESCRIPTION OF PRIOR ART

Known in the art are antibiotics identified as megalomicin A, megalomicin B, megalomicin $C_1$ and megalomicin $C_2$ which are produced as a mixture by cultivation of *Micromonospora megalomicea* under submerged aerobic conditions as described in co-pending application Ser. No. 855,424, filed Sept. 4, 1969, now U.S. Pat. No. 3,632,750, of Marvin J. Weinstein, George M. Luedemann, Gerald H. Wagman, and Joseph A. Marquez for *Antibiotic W847 (Megalomicin)* and Methods for Production Thereof. Megalomicin A is a hydroxylated macrolide antibiotic having an erythronolide nucleus to which is attached an O-α-L-mycarosyl moiety at C-3, an O-β-D-desosaminyl moiety at C-5, and an O-β-D-rhodosaminyl moiety at C-11, said megalomicin A having the chemical name 3-O-(α-L-mycarosyl)-5-O-(β-D-desosaminyl)-11-O-(β-D-rhodosaminyl)-erythronolide. In megalomicin A, secondary hydroxyl groups are present at positions 4',2'' and 4''' and tertiary hydroxyl groups at positions 6, 12 and 3'. Megalomicin B is the 4'-acetyl ester of megalomicin A; megalomicin $C_1$ is the 3',4'-diacetyl ester of megalomicin A; and megalomicin $C_2$ is the 3'-acetyl-4'-propionyl ester of megalomicin A.

Also known in the art are secondary ester derivatives of megalomicin A, B, $C_1$ and $C_2$ or mixtures thereof which also possess antibiotic activity. These secondary esters are derived from the parent antibiotic or antibiotic mixture by procedures known to esterify secondary hydroxyl groups while not esterifying tertiary hydroxyl groups as described in co-pending application Ser. No. 855,424 of M. J. Weinstein et al. These procedures comprise treating a megalomicin component in neutral or basic media with the anhydride of a hydrocarbon carboxylic acid, e.g. in pyridine or dry acetone at room temperature, whereby are prepared secondary ester derivatives, i.e. the 2'',4'''-diacyl derivatives of megalomicin A, B, $C_1$ and $C_2$, and the 4',2'',4'''-triacyl derivatives of megalomicin A.

By our invention we have discovered that by submitting megalomicin A or secondary ester derivatives thereof having a 3'-hydroxyl group, to "forcing" basic esterification conditions comprising treatment with an excess of hydrocarboncarboxylic acid anhydride in a basic solvent such as pyridine at elevated temperatures and/or for long periods of time, there are formed 3',4',2'',4'''-tetraacylmegalomicin A derivatives wherein the tertiary hydroxyl group at the 3' position is esterified but the tertiary hydroxyl groups at C-6 and C-12 remain unesterified.

We have also discovered that, surprisingly, when the megalomicin starting compound has an acyl ester function at C-4' adjacent to the tertiary hydroxyl group at C-3' (such as is present in megalomicin B and in the prior art secondary 4',2'',4'''-triacyl derivatives of megalomicin A and in the secondary 2'',4'''-diacyl derivatives of megalomicin B) and when said starting compound is subjected to the forcing esterification conditions of our process, the acyl radical present at the secondary 4'-position migrates and replaces the hydrogen atom in the tertiary hydroxyl group at the 3'-position, while the acyl residue of the hydrocarbon carboxylic acid anhydride reagent enters at the vacated 4'-position. When the acyl group of the esterification reagent is different from the acyl group in the 4'-position, there are thus formed mixed 3',4',2'',4'''-tetra esters. When no acyl radical is present at C-4' of the starting megalomicin A derivative, or when the 4'-acyl group is the same as the acyl group of the esterification reagent, there are formed 3',4',2'',4'''-tetraacyl esters having identical acyl radicals. The aforedescribed 3',4',2'',4'''-tetraacylmegalomicin A esters of our invention having either like or dissimilar acyl radicals could not otherwise be prepared by methods now known in the art. These novel 3',4',2'',4'''-tetraacylmegalomicin A esters possess antibiotic activity and also serve as intermediates in the selective hydrolysis process of our invention whereby are prepared novel 3',4'-diacylmegalomicin A and 3',4',4'''-triacylmegalomicin A derivatives having antibiotic activity. In turn, 3',4'-diacylmegalomicin A derivatives, in addition to possessing antibiotic activity, also can be selectively esterified whereby are prepared novel 3',4',2''-triacylmegalomicin A derivatives having antibiotic activity. The foregoing 3',4'-diacyl-3',4',4'''-triacyl- and 3',4',2''-triacylmegalomicin A esters could not otherwise be prepared via direct esterification of megalomicin A by prior art procedures.

SUMMARY OF INVENTION

The invention sought to be patented in its composition-of-matter aspect resides in the concept of a chemical compound having a molecular structure comprising a megalomicin A nucleus wherein tertiary hydroxyl groups at the 6 and 12 positions are unesterified and the tertiary hydroxyl group at the 3'-position as well as the secondary hydroxyl group at the 4'-position are esterified by a hydrocarbon carboxylic acid, the 4'-acyl radical having at least 4 carbon atoms when a 3'-acetyl function is present in said compound. Included in the composition-of-matter aspect of this invention are 3',4'-diacyl-, 3',4',4'''-triacyl-, 3',4',2''-triacyl- and 3',4',2'',4'''-tetraacylmegalomicin A esters and the pharmaceutically acceptable acid addition salts thereof which possess antibiotic activity.

The invention sought to be patented in its esterification process aspect resides in the concept of treating megalomicin A or a secondary ester derivative thereof having acyl radicals derived from hydrocarbon carboxylic acids of from 2 to 18 carbon atoms and having a 3'-hydroxyl function with an excess of hydrocarbon carboxylic acid anhydride having from 2 to 18 carbon atoms in a basic medium at a temperature in the range of from about 60° to about 120°C, whereby is formed a 3',4',2'',4'''-tetraacylmegalomicin A wherein the 4'- acyl is derived from said hydrocarbon carboxylic anhydride reagent and wherein, when said megalomicin A starting compound has 4'-acyl radical, the 3'-acyl of said 3',4',2'',4'''-tetraacylmegalomicin A product thereby produced is derived from the 4'-acyl of the starting megalomicin A derivative.

The invention sought to be patented in another process aspect of this invention is that whereby the 3',4'-diacylmegalomicin A and 3',4',4'''-triacylmegalomicin A ester derivatives are prepared and resides in the concept of subjecting to mild hydrolysis a 3',4',2'',4'''-tetraacylmegalomicin A. When preparing 3',4'-diacylmegalomicin A, there may also be used as starting compounds, 3',4',4'''-triacyl- and 3',4',2''-triacylmegalomicin A esters. Preferred mild hydrolytic procedures for preparing 3',4'-diacylmegalomicin A include treating a tetraacylmegalomicin A with an alcoholic-aqueous alkali metal carbonate solution (e.g. methanolic-aqueous potassium bicarbonate) or with either an aqueous lower alkanol or an anhydrous lower alkanol (e.g. aqueous methanol or methanol alone). Preferred mild hydrolytic procedures for preparing 3',4',4'''-triacylmegalomicin A includes treating a tetraacylmegalomicin A in a lower alkanol in the presence of catalytic amounts of p-toluenesulfonic acid.

GENERAL DESCRIPTION OF INVENTION

Composition-of-Matter Aspect

Included among the physical embodiments of the composition-of-matter aspect of this invention are 3'-acylmegalomicin A ester derivatives selected from the group consisting of 3',4'-diacylmegalomicin A, 3',4',2''-triacylmegalomicin A, 3',4',4'''-triacylmegalomicin A, 3',4',2'',4'''-tetraacylmegalomicin A and pharmaceutically acceptable acid addition salts of the foregoing, said esters being members selected from the group consisting of a compound having the following structural formula I;

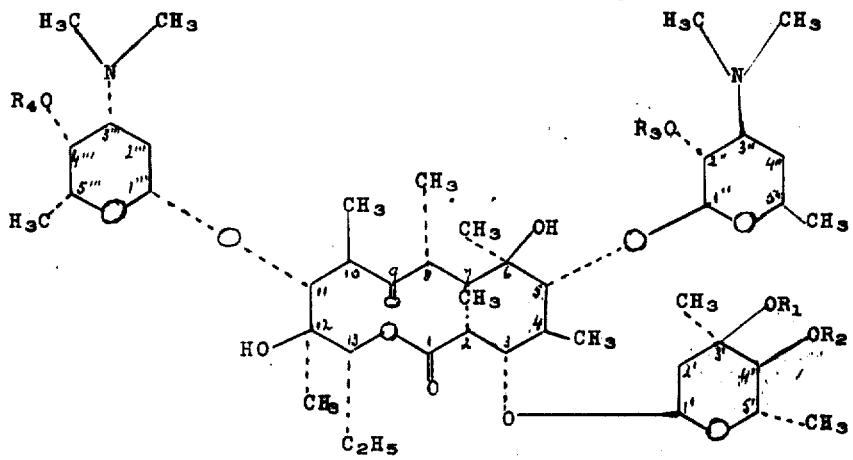

I wherein $R_1$ and $R_2$ are each an acyl radical of a hydrocarbon carboxylic acid having from 2 to 18 carbon atoms, $R_2$ having at least 4 carbon atoms when $R_1$ is acetyl; and $R_3$ and $R_4$ are each members selected from the group consisting of hydrogen and an acyl radical of a hydrocarbon carboxylic acid having from 2 to 18 carbon atoms; and the pharmaceutically acceptable acid addition salts of the foregoing esters of formula I.

The acyl radicals in the compounds of our invention are derived from hydrocarbon carboxylic acids containing from 2 to 18 carbon atoms and may be saturated, unsaturated, straight chain or branched chain aliphatic, cyclic, cyclic-aliphatic, aromatic, aryl-aliphatic, or alkyl-aromatic, and may be substituted by hydroxy, alkoxy containing from 1 to 5 carbon atoms, or by a halogen such as fluorine, chlorine or bromine. Typical ester groups of the 3'-acylmegalomicin A ester derivatives of this invention are thus derived from hydrocarbon carboxylic acids such as alkanoic acids including acetic, propionic, trimethylacetic, butyric, isobutyric, valeric, iso-valeric, caproic, caprylic, capric, undecylic, lauric, myristic, palmitic and stearic acids; substituted alkanoic acids such as phenoxyacetic, and β-chloropropionic acids; aromatic and substituted aromatic acids including benzoic, toluic, chlorobenzoic acids; aralkanoic acids such as phenylacetic and phenylpropionic acids; unsaturated acids such as acrylic, sorbic, and linolenic acids; and dibasic acids such as succinic, tartaric and phthalic acids.

In this specification and in the claims, by "acyl radical" is meant the group of atoms "RCO—", R being a hydrocarbon group having from 1 to 17 carbon atoms (not to be confused with the term "free radical").

The megalomicin A esters of this invention are indentified by conventional nomenclature. Thus, the non-esterified hydroxylated precursor of the esters of this invention, i.e. megalomicin A (which is the compound defined by formula I, wherein $R_1,R_2,R_3$ and $R_4$ are hydrogen) may also be identified by the chemical name 3-O-(α-L-mycarosyl)-5-O-(β-D-desosaminyl)-11-O-(β-D-rhodosaminyl)-erythronolide. The carbon atoms in the compounds of formula I are thus numbered in accordance with the conventional procedure used for macrolide derivatives, carbons 1 to 13 of the erythronolide aglycone being as shown above in formula I, the carbon atoms in the mycarose moiety at C-3 being given prime numbers, the carbon atoms in the desosamine moiety at C-5 being given double prime numbers and the carbon atoms in the rhodosamine moiety at C-11 being given triple prime numbers.

Thus, a tetraacyl ester of our invention, e.g. 3'-propionyl-4',2'',4'''-triacetylmegalomicin A is a compound of formula I wherein $R_1$ is propionyl and $R_2,R_3$ and $R_4$ are acetyl; whereas, a diacyl ester of our invention, e.g. 3'-propionyl-4'-acetylmegalomicin A is a compound of formula I, wherein $R_1$ is propionyl, $R_2$ is acetyl, and $R_3$ and $R_4$ are hydrogen.

Included within the composition-of-matter aspect of this invention are ester derivatives of megalomicin A containing a 3'-tertiary ester group (excluding the naturally occurring 3',4'-diacetylmegalomicin A identified also as megalomicin $C_1$, and 3'-acetyl-4'-propionylmegalomicin A identified also as megalomicin $C_2$) and pharmaceutically acceptable acid addition salts thereof. Typical ester derivatives of our invention include 3',4',2'',4'''-tetraacylmegalomicin A derivatives (i.e. compounds of formula I wherein $R_1, R_2, R_3$ and $R_4$ are all acyl radicals of hydrocarbon carboxylic acids having at least 2 carbon atoms, $R_2$ having at least 4 carbon atoms when $R_1$ is acetyl) exemplified by:

3',4',2'',4'''-tetrapropionylmegalomicin A ($R_1=R_2=R_3=R_4$=propionyl),

3',4',2'',4'''-tetraisovalerylmegalomicin A ($R_1=R_2=R_3=R_4$=isovaleryl)

3',2'',4'''-triacetyl-4'-isovalerylmegalomicin A ($R_1=R_3=R_4$=acetyl; $R_2$=isovaleryl), 3',2'',4'''-tripropionyl-4'-acetylmegalomicin A ($R_1=R_3=R_4$=propionyl; $R_2$=acetyl), and 3',2'',4'''-tribenzoyl-4'-propionylmegalomicin A ($R_1=R_3=R_4$=benzoyl; $R_2$=propionyl).

Our invention also includes 3',4'-diacylmegalomicin A derivatives (i.e. compounds of formula I wherein $R_3=R_4$=hydrogen and $R_1$ and $R_2$ are acyl, $R_2$ having at least 4 carbon atoms when $R_1$ is acetyl) exemplified by:

3',4'-dipropionylmegalomicin A,
3',4'-diisovalerylmegalomicin A,
4'-acetyl-3'-propionylmegalomicin A,
4'-acetyl-3'-isovalerylmegalomicin A,
and 3'-benzoyl-4'-propionylmegalomicin A.

Other compounds of our invention include 3',4',2''-triacylmegalomicin A derivatives (i.e. compounds of formula I wherein $R_4$ is hydrogen, and $R_1, R_2$ and $R_3$ are acyl, $R_2$ having at least 4 carbon atoms when $R_1$ is acetyl) exemplified by:

3',4',2''-tripropionylmegalomicin A,
4'-acetyl-3',2''-dipropionylmegalomicin A, and
3'-benzoyl-4',2''-dipropionylmegalomicin A.

Also included are 3',4',4'''-triacylmegalomicin A derivatives (i.e. compounds of formula I wherein $R_3$ is hydrogen, and $R_1, R_2$, and $R_4$ are acyl, $R_2$ having at least 4 carbon atoms when $R_1$ is acetyl) exemplified by:

3',4',4'''-tripropionylmegalomicin A,
3',4'''-diacetyl-4'-isovalerylmegalomicin A, and
4'-caproyl-3',4'''-dipropionylmegalomicin A.

The physical embodiments of the compounds of this invention as defined by formula I, i.e. 3',4',2'',4'''-tetraacylmegalomicin A and 3',4'-diacylmegalomicin A are characterized by being white solids which are generally insoluble in water and soluble in most organic solvents including halogenated hydrocarbons, e.g. chloroform and carbon tetrachloride, nitrogen-containing solvents, e.g. pyridine and dimethylformamide, and ketones, e.g. acetone, and the like.

Contemplated within the composition-of-matter aspect of this invention are pharmaceutically acceptable acid addition salts of the tertiary ester derivatives of megalomicin A as defined by formula I, which can be made according to known procedures by neutralizing the free base with the appropriate acid to below about pH 7.0 and, advantageously, to about pH 6. Suitable acids for this purpose are such as hydrochloric, sulfuric, phosphoric, hexafluoroarsenic, hexafluorophosphoric, acetic, succinic, citric, camphoric, glutaric, glycolic, phthalic, tartaric, lauric, stearic, salicylic, 3-phenylsalicylic, 5-phenylsalicylic, 3-cyclopentylpropionic, 1,2-cyclohexane-dicarboxylic, cyclohexanecarboxylic, octadecenylsuccinic, dimethyldithiocarbamic, cyclohexylsulfamic, hexadecylsulfamic, octadecylsulfamic, sorbic, monochloroacetic, undecylenic, 4'-hydroxy-azobenzene-4-sulfonic, laurylsulfuric acid, benzoic, cinnamic and like acids.

The physical embodiments of the acid addition salts of the tertiary esters of megalomicin A as defined by formula I are generally characterized by being white or off-white solids which are usually soluble in water and to some degree in lower alcohols, e.g. methanol and ethanol, and are insoluble in most organic solvents. Salts of fatty acids having long hydrocarbon chains e.g. laurylsulfuric acid usually are insoluble in water.

The novel 3',4',2'',4'''-tetraacylmegalomicin A, and 3',4',2''-triacylmegalomicin A, 3',4',4'''-triacylmegalomicin A, and 3',4'-diacylmegalomicin A esters of this invention as defined by formula I, including the pharmaceutically acceptable acid addition salts thereof, exhibit antibiotic activity in vitro against both gram positive bacteria (e.g. Staphylococcus aureus ATCC 6538P and other strains thereof) and against gram negative becteria (e.g. *Escherichia coli* ATCC 10536 and other strains thereof) when tested according to the well-known tube dilution assay in yeast beef broth adjusted to pH 8.0 with sodium hydroxide. Our compounds are thus useful for cleaning and sterilizing laboratory glassware and surgical instruments and may also be used in combination with soaps, detergents and wash solutions for sanitation purposes as in the washing of hands, and in the cleaning and sanitizing of hospital rooms and areas used for food preparation such as kitchens, dining halls and the like.

Preferred ester derivatives of this invention are 3',4'-diacylmegalomicin A and 3',4',2'',4'''-tetraacylmegalomicin A wherein the acyl groups, particularly the acyl group at C-3', are derived from a lower alkanoic acid having from 3 to 8 carbon atoms since these ester derivatives usually have an advantageous combination of antibiotic acitvity together with good absorption characteristics and low toxicity as evidenced by tests in mice, rats and dogs. Of particular interest are the ester derivatives of our invention wherein all the acyl groups are propionyl, i.e. 3',4',2'',4'''-tetrapropionyl megalomicin A and 3',4'-dipropionyl megalomicin A which exhibit good antibiotic activity at doses well below the toxic level as evidenced by test results in mice set forth in Table A. Of the foregoing, 3',4'-dipropionyl megalomicin A exhibits good absorption characteristics, being absorbed in the rat and dog via the oral route as well as via the subcutaneous route in the rat and intramuscularly in the dog. (See Table A.)

TABLE A

| Compound | Route | Protective Activity in Mice (against lethal intraperitoneal infections of *staphylococcus aureus*) *$PD_{50}$ (mg/kg) | Toxicity in Mice *$LD_{50}$ (mg/kg) | Absorption in Rats and Dogs (single dose; megalomicin A as standard of antibiotic activity) Peak Serum Levels (mcg/ml) | |
|---|---|---|---|---|---|
| | | | | Rats (40 mg/kg) | Dogs (50 mg/kg oral) (10 mg/kg I.M.) |
| 3',4',2'',4'''-tetra- | Oral | 125 – 300 | >2,000 | 0.5 | 0 |

TABLE A—Continued

| Compound | Route | Protective Activity in Mice (against lethal intraperitoneal infections of staphylococcus aureus) *PD$_{50}$ (mg/kg) | Toxicity in Mice *LD$_{50}$ (mg/kg) | Absorption in Rats and Dogs (single dose; megalomicin A as standard of antibiotic activity) Peak Serum Levels (mcg/ml) | |
|---|---|---|---|---|---|
| propionyl-megalomicin A[1] | Subcutaneous Intraperitoneal Intramuscular | 50 – 125 | 1,500 1,500 | 0 | 0 |
| 3',4'-dipropionyl-megalomicin A[1] | Oral | 125 – 250 | 750 | 0.3 | 2.6 |
| | Subcutaneous Intraperitoneal Intramuscular | 5 – 25 | 750 500 | 1.0 | 0.4 |
| | | *PD$_{50}$ is the protective dose for 50% of the population tested | *LD$_{50}$ is the lethal dose for 50% of the population tested | | |

[1] Suspended in 0.5% aqueous carboxymethylcellulose except via oral route in dogs administered in capsules.

The antibiotic acitivty, absorption and toxicity characteristics of the 3',4'-diacyl-, 3',4',2''-triacyl-, 3',4',4'''-triacyl- and 3',4',2'',4'''-tetraacylmegalomicin A compounds of this invention vary depending upon the specific acyl radicals present in the compound, particularly in the 3' and 4' positions. By our invention it is now possible to prepare 3',4'-diacyl-, 3',4',2''-triacyl-, 3',4',4'''-triacyl- and 3',4',2'',4'''-tetraacylmegalomicin A derivatives heretofore impossible to make, having acyl groups different from those present in prior art megalomicin A esters and, therefore, having different antibiotic spectra suitable for different indications. For example, 3',4'-dipropionylmegalomicin A of our invention has both enhanced gram positive and gram negative activity (as evidenced by the minimum inhibitory concentration data set forth in Table B) as compared to that possessed by the prior art hydroxy precursor, megalomicin A, and the prior art 3',4'-megalomicin A esters, i.e. 3',4'-diacetylmegalomicin A (Megalomicin C$_1$) and 3'-acetyl-4'-propionylmegalomicin A (Megalomicin C$_2$). In particular, the gram negative activity of 3',4'-dipropionylmegalomicin A is greatly enhanced over that of the aforementioned megalomicin A precursors (some of which have minimal gram negative activity), while also having enhanced gram positive activity, thus rendering 3',4'-dipropionylmegalomicin A the antibiotic of choice over the aforementioned when treating mixed gram positive and gram negative bacterial infections.

Additionally as evidenced by the data set forth in Table B, 3',4',2'',4'''-tetrapropionylmegalomicin A of our invention has greatly enhanced gram positive activity over that possessed by the prior art 3',4',2'',4'''-tetraacetylmegalomicin A, while being substantially devoid of gram negative activity, thus making 3',4',2'',4'''-tetrapropionylmegalomicin A a compound of choice over the corresponding tetraacetylmegalomicin A when treating gram positive bacterial infections.

In addition to possessing antibiotic activity per se, the 3',4',2'',4'''-tetraacylmegalomicin A esters of our invention are also useful as intermediates in the hydrolysis process of this invention whereby 3',4'-diacylmegalomicin A and 3',4',4'''-triacylmegalomicin A compounds are formed.

The acid addition salts of the tertiary esters of megalomicin A of this invention, e.g. 3',4',2'',4'''-tetrapropionylmegalomicin A ditartrate salt and 3',4'-dipropionylmegalomicin A bis-potassium dihydrogen phosphate salt, can be used for the same biological purpose as the free bases as defined by formula I, e.g. 3',4-',2'',4'''-tetrapropionylmegalomicin A and 3',4'-dipropionylmegalomicin A respectively. Alternatively, the acid addition salts can be used as a means to further purify the free base megalomicin A esters by conversion thereof to an acid addition salt according to known techniques; then after isolation and purification of the crystalline acid addition salt or solution thereof regenerating the free base megalomicin tertiary ester derivative by treatment with alkali.

TABLE B

Tube Dilution Assay in yeast beef broth adjusted to pH 8.0 with sodium hydroxide

| | 3',4',2'',4'''-Tetrapropionyl-megalomicin A | 3',4'-Dipropionyl-megalomicin A | Megalomicin A | Megalomicin C$_1$ (3',4'-Diacetyl-megalomicin A) | Megalomicin C$_2$ (3'-Acetyl-4'-propionyl-megalomicin A) | 3',4',2'',4'''-Tetraacetyl-megalomicin A |
|---|---|---|---|---|---|---|
| | Minimum Inhibitory Concentration (mcg/ml) | | | | | |
| Staphylococcus aureus ATCC 6538P | <0.01 | 0.01 | 0.075 | 0.075 | 0.75 | 0.3 |
| Staphylococcus aureus W | <0.01 | 0.01 | 0.075 | 0.075 | 0.75 | 0.3 |
| Staphylococcus aureus Smith | <0.01 | 0.01 | 0.075 | 0.075 | 0.75 | 0.3 |
| Staphylococcus aureus 895 | <0.01 | 0.01 | 0.03 | 0.075 | 0.3 | 0.025 |
| Staphylococcus aureus 842 | <0.01 | 0.01 | 0.075 | 0.075 | 0.3 | 0.075 |
| Staphylococcus aureus 992 | <0.01 | 0.01 | 0.03 | 0.03 | 0.3 | 0.075 |
| Escherichia coli ATCC 10536 | 17.5 | 0.3 | 3.0 | 7.5 | >25 | 7.5 |
| Escherichia coli B | 17.5 | 0.3 | 0.75 | 7.5 | >25 | 7.5 |
| Escherichia coli D | >25 | 0.3 | 3.0 | 17.5 | >25 | 17.5 |
| Escherichia coli E | >25 | 0.3 | 0.75 | 17.5 | >25 | 17.5 |
| Escherichia coli 754 | >25 | 0.3 | 0.75 | 7.5 | >25 | 17.5 |
| Escherichia coli 815 | 17.5 | 0.075 | 0.3 | 7.5 | >25 | 7.5 |

Esterification Process Aspect of the Invention

The esterification process of this invention provides a method for preparing 3',4',2'',4'''-tetraacylmegalomicin A esters and resides in the concept of treating megalomicin A or an esterified derivative thereof having a tertiary 3'-hydroxy function with an excess of hydrocarbon carboxylic acid anhydride having from 2 to 18 carbon atoms, in a basic medium at temperatures in the range of from about 60° to about 120°C whereby is formed a 3',4',2'',4'''-tetraacylmegalomicin A wherein the 4'-acyl radical is derived from the hydrocarbon carboxylic acid anhydride reagent and wherein, when the starting megalomicin A derivative has a 4'-acyl radical, the 3'-acyl of the 3',4',2'',4'''-tetraacylmegalomicin A thereby formed is derived from the 4'-acyl of the starting megalomicin A compound.

The starting compounds of our invention, i.e. megalomicin A and secondary esters thereof having a 3'-hydroxy function, are, in general, known compounds or can be prepared as described in copending application Ser. No. 855,424 of M. J. Weinstein et al., now U.S. Pat. No. 3,632,750. Such starting compounds include megalomicin A, 2''-monoacylmegalomicin A, 4'''-monoacylmegalomicin A, 4'-acetylmegalomicin A, 2'',4'''-diacylmegalomicin A, and 4',2'',4'''-triacylmegalomicin A and mixtures of the foregoing. The starting compounds most easily available by virtue of their method of manufacture for use in our process are megalomicin A, 2'',4'''-diacylmegalomicin A, 4',2'',4'''-triacylmegalomicin A and 4'-acetylmegalomicin A (i.e. megalomicin B). Other 4'-monoacylmegalomicin A starting compounds are derived from 4',2'',4'''-triacylmegalomicin A by selective hydrolysis with aqueous methanol according to procedures described herein.

In our process, by "an excess" of acid anhydride is contemplated a molar quantity of acid anhydride per mole of megalomicin A starting compound greater than the number of molar equivalents of free hydroxyl groups present per mole of megalomicin A starting compound. Thus, when megalomicin A (which has six hydroxyl groups) is utilized as starting compound at least over six moles of acid anhydride per mole of megalomicin A are employed as reagent in our process; whereas, if 2'',4'''-diacetylmegalomicin A (having four free hydroxyl groups) is the starting compound, at least over four moles of acid anhydride reagent per mole of 2'',4'''-diacetylmegalomicin A are used. Usually, when carrying out our process we have found it advantageous to employ about 5 moles to about 20 moles, preferably about 10 moles, of acid anhydride per mole of megalomicin A derivative.

The necessary acylating reagents for this process, i.e. acid anhydrides of hydrocarbon carboxylic acids having up to 18 carbon atoms, are known compounds prepared by known procedures from hydrocarbon carboxylic acids such as those listed hereinabove under formula I with reference to the compounds defined thereby. Preferred acylating reagents are the acid anhydrides of hydrocarbon carboxylic acids having up to 8 carbon atoms, e.g. the anhydrides of lower alkanoic acids such as acetic, propionic, n-butyric, iso-butyric, n-valeric, isovaleric, trimethylacetic, caproic and caprylic acids, as well as the anhydrides of arylcarboxylic acids such as benzoic and toluic acids.

Among the basic media contemplated as suitable for use in this process are tertiary aliphatic and aromatic amines including cyclic amines having a boiling point in the range of from about 60° to about 120°C, e.g. triethyl amine and, preferably, pyridine, which serve both as solvent and basic agent.

In carrying out our esterification process, "forcing" conditions are employed involving the use of large molar excesses of hydrocarbon carboxylic acid anhydride per mole of megalomicin A derivative, there usually being employed at least about ten moles acid anhydride per mole of megalomicin A derivative. The esterification reaction is carried out at elevated temperatures, usually in the range of from about 60° to about 120°C, preferably about 115°C. for long periods of time usually ranging from about 10 hours to about 8 days. The esterification reaction can be followed via thin layer chromatographic techniques, and is continued until the thin layer chromatogram of an aliquot indicates the reaction mixture contains substantially 3',4',2'',4'''-tetraacylmegalomicin A. When higher temperatures are employed, the rate of reaction is faster and greater yields of 3',4',2'',4'''-tetraacylmegalomicin A are obtained in less time than at lower temperatures. Thus, upon treating 4',2'',4'''-tripropionylmegalomicin A with propionic anhydride in pyridine to obtain 3',4',2'',4'''-tetrapropionylmegalomicin A according to our process, when the reaction mixture is kept at 80°C; 7 days reaction time are required in order to obtain substantial yields of the 3',4',2'',4'''-tetrapropionylmegalomicin A; whereas, only 20 hours are required to obtain good yields of product when the reaction mixture is kept at 115°C.

In a preferred method of carrying out our process, a solution of megalomicin A or an ester derivative thereof having a 3'-hydroxy group (e.g. megalomicin A or 4',2'',4'''-tripropionylmegalomicin A) in pyridine is heated at reflux temperature (about 115°C) for about 20 hours with a large molar excess of hydrocarbon carboxylic acid anhydride (e.g. propionic anhydride, the molar quantity of anhydride usually being 10 moles per mole of megalomicin A derivative). The 3',4',2'',4'''-tetraacylmegalomicin thereby produced (e.g. 3',4',2'',4'''-tetrapropionylmegalomicin A) is then isolated in good yields utilizing conventional techniques such as by concentrating the reaction mixture to a residue, treating the residue with a mild base, (e.g. 5% aqueous sodium carbonate solution or 1.5N ammonium hydroxide) followed by purification via crystallization or chromatography.

By our process, we are able to prepare novel tetraesters of megalomicin which cannot be prepared by any other known method wherein the tertiary hydroxyl group at C-3' is esterified but wherein the tertiary hydroxy groups at positions 6 and 12 on the macrolide aglycone of megalomicin A are left unchanged even though our process is carried out under forcing conditions, i.e. using large molar excesses of acid anhydride together with elevated reaction temperatures and long reaction times.

A surprising and unexpected feature of our process is the transfer of any 4'-acyl group present in the megalomicin A starting intermediate to the 3'-position with concomitant esterification of the vacated 4'-hydroxy by the acyl anhydride reagent. Because of this unusual feature, by utilizing an acid anhydride reagent having an acyl function different from that present at C-4' we are able to prepare novel, mixed tetra-esters wherein the 3'- and 4'-acyl functions are different from each other, which esters cannot be prepared by esterification methods known in the art. Thus, for example, upon treatment of 4',2'',4'''-triacetylmegalomicin A with a large molar excess of isovaleric acid anhydride in pyridine at 80°C for 7 days according to our process, the 4'-acetyl migrates to the 3'-position and an isovaleryl radical enters the 4'-position and there is formed 4'-isovaleryl-3',4'',4'''-triacetylmegalomicin A having antibiotic activity. The foregoing ester cannot be made via prior art techniques from known megalomicin A derivatives, i.e. from megalomicin A, megalomicin B (4'-acetylmegalomicin), megalomicin $C_1$ (3',4'-diacetylmegalomicin A), megalomicin $C_2$ (3'-acetyl-4'-propionylmegalomicin A) or 2''-acyl and/or 4'''-acyl esters thereof. By our esterification process we are able, therefore, to obtain novel esters having enhanced and/or different antibiotic activity from the naturally occurring megalomicin antibiotics or known, secondary ester derivative thereof.

By our esterification process it is also possible to prepare ester derivatives of megalomicin $C_1$ and of megalomicin $C_2$ from megalomicin A or from megalomicin B (4'-acetylmegalomicin A). Thus, for example, treatment of megalomicin B (4'-acetylmegalomicin A) with excess acetic anhydride in pyridine at 115°C for 10 hours yields 2'',4'''-diacetylmegalomicin $C_1$ (i.e. 3',4',2'',4'''-tetraacetylmegalomicin A) whereas treatment of megalomicin B with propionic anhydride in pyridine at 115°C for 20 hours yields 2'',4'''-dipropionylmegalomicin $C_2$, i.e. 3'-acetyl-4',2'',4'''-tripropionylmegalomicin A. In each of the foregoing, the 4'-acetyl migrates to C-3' with esterification at C-4' by the acid anhydride reagent. In the former case, since the original 4'-acyl is the same as the acid anhydride acyl radical, the migration of the 4'-acyl is not apparent.

Hydrolysis Process Aspect

By the hydrolysis process aspect of our invention, it is possible to prepare tertiary 3',4',4'''-triacylmegalomicin A and 3',4'-diacylmegalomicin A derivatives (including the naturally occurring megalomicin $C_1$ and $C_2$) from tertiary 3',4',2'',4'''-tetraacylmegalomicin A compounds prepared by the esterification process of this invention. Our hydrolysis process comprises subjecting a 3',4',2'',4'''-tetraacylmegalomicin A to mild hydrolytic conditions whereby the secondary ester functions at C-2'' and at C-4'''- are selectively hydrolyzed, the C-2'' ester being the first to hydrolyze, and there is first formed a 3',4',4'''-triacylmegalomicin A and thence a 3',4'-diacylmegalomicin A.

Contemplated as included within the term mild hydrolytic conditions are reactions utilizing as hydrolyzing reagents lower alkyl alcohols alone (e.g. methanol and ethanol) or aqueous alcoholic solutions. Additionally, aqueous alcoholic solutions containing basic compounds such as sodium carbonate, sodium bicarbonate, and ammonia may be employed. When preparing a 3',4'-diacylmegalomicin A, neutral or basic hydrolytic conditions are usually employed; whereas, when it is desired to isolate a 3',4',4'''-triacylmegalomicin A, acidic hydrolytic conditions (e.g. catalytic quantities of p-toluenesulfonic acid in methanol) are conveniently utilized.

The selective hydrolysis of our invention is generally carried out at ambient temperature, although elevated temperatures (reflux temperatures being used frequently) may be employed. The course of the hydrolysis is followed by monitoring aliquots of the reaction solution at intervals via thin layer chromatography. When a 3',4',4'''-triacyl derivative is desired, the reaction is stopped when the chromatogram indicates the 3',4',4'''-triacylmegalomicin A thereby formed is being further hydrolyzed to the 3',4'-diacyl derivative. When preparing a 3',4'-diacyl derivative, the reaction is continued until no further triacyl derivative remains in the reaction mixture, the total reaction time required when the reaction is carried out at room temperature being usually several days.

A convenient method of carrying out the physical embodiment of this process when preparing a 3',4'-diacylmegalomicin A is to allow the 3',4',2'',4'''-tetraacylmegalomicin A (e.g. 3',4',2'',4'''-tetrapropionylmegalomicin A) to remain in a methanolic-aqueous solution of potassium bicarbonate (e.g. 0.05N potassium bicarbonate in 70% aqueous methanol) at ambient temperature (about 25°C) for about 5 days. Upon isolation of the hydrolysis product thereby formed utilizing known techniques such as solvent extraction and chromatographic techniques, there is isolated in excellent yields 3',4'-diacylmegalomicin A (e.g. 3',4'-dipropionylmegalomicin A of this invention). The reaction time may be shortened by carrying out the reaction at reflux temperature, and monitoring aliquots of the reaction solution at intervals via thin layer chromatography and stopping the reaction when the chromatogram indicates all the 3',4',2'',4'''-tetra-ester and 3',4',4'''-tri-ester have been consumed. Other reaction conditions for carrying out the hydrolysis of this process aspect of our invention are outlined in a table in Example 11 herein. Additionally, other starting compounds of this process include 3',4',2''-triacylmegalomicin A derivatives.

When preparing a 3',4',4'''-triacylmegalomicin A, a convenient method of carrying out the physical embodiment of this process is to heat at reflux temperature a methanolic solution containing a few crystals of p-toluenesulfonic acid and the 3',4',2'',4'''-tetraacylmegalomicin A (e.g. 3',4',2'',4'''-tetrapropionylmegalomicin A), and monitoring the reaction until a chromatogram of an aliquot of the reaction mixture indicates 3',4'-diacyl derivative is being formed (frequently in about an hour). The 3',4',4'''-triacyl derivative thereby formed (e.g. 3',4',4'''-tripropionylmegalomicin A) is isolated and purified utilizing chromatographic techniques.

By a combination of the process aspects of our invention it is possible to also prepare the known, naturally occurring, di-esters, i.e. megalomicin $C_1$ and megalomicin $C_2$, from megalomicin A and B and secondary ester derivatives thereof. Thus, megalomicin A or megalomicin B on treatment with a large molar excess of acetic anhydride or propionic anhydride respectively, in pyridine according to our process yields (with concomitant migration of the 4'-acetyl to the 3'-position) 2'',4'''-diacetylmegalomicin $C_1$ (i.e. 3',4',2'',4'''-tetraacetylmegalomicin A) and 2'',4'''-dipropionylmegalomicin $C_2$ (i.e. 3'-acetyl-4',2'',4'''-tripropionylmegalomicin A), respectively. Hydrolysis of each of the foregoing under mild conditions, for example with methanol at room temperature for 1 week, yields 3',4'-diacetylmegalomicin A and 3'-acetyl-4'-propionylmegalomicin A respectively, which are identical to megalomicin $C_1$ and $C_2$ respectively.

The foregoing chemical syntheses of megalomicin $C_1$ and $C_2$ provide convenient alternate methods for preparing these antibiotics, the latter of which is produced in relatively low yield via microbiological methods by cultivation of *Micromonospora megalomicea*.

The 3',4',2''-triacylmegalomicin A derivatives are prepared from 3',4'-diacylmegalomicin A via selective esterification techniques such as that wherein a 3',4'-di-ester (e.g. 3',4'-di-propionylmegalomicin A) is reacted with an equimolar quantity of an acid anhydride (e.g. propionic anhydride) in acetone at room temperature whereby is prepared a 3',4',2''-tri-ester (e.g. 3',4',2''-tripropionylmegalomicin A.)

It will be readily apparent to those skilled in the art that by combining the various esterification and hydrolysis processes described herein, it is possible to prepare 3',4'-diacyl-, 3',4',2''-triacyl-, 3',4',4'''-triacyl-, and 3',4',2'',4'''-tetraacylmegaolmicin A compounds of this invention having different acyl radicals in various combinations. Thus, by the esterification process of this invention, megalomicin A is easily converted by reaction in pyridine with an excess of propionic anhydride into 3',4',2'',4'''-tetrapropionylmegalomicin A which, upon mild hydrolysis under basic conditions, is convertible to 3',4'-dipropionylmegalomicin A. Reaction of the foregoing with an equimolar quantity of a hydrocarbon carboxylic acid anhydride (e.g. isovaleryl anhydride) in acetone at room temperature will produce the 3',4',2''-tri-ester-, 3',4'-dipropionyl-2''-isovalerylmegalomicin A. Esterification of the foregoing with an equimolar quantity of caprioc anhydride in pyridine at room temperature will yield a mixed 3',4',2'',4'''-tetraester, i.e. 4'''-caproyl-3',4'-dipropionyl-2''-isovalerylmegalomicin A.

The following examples are given by way of illustration are are not to be construed as limitations of this invention, the scope of which is indicated by the appended claims.

EXAMPLE 1

3',4',2'',4'''-Tetrapropionylmegalomicin A

A. Dissolve 5.0 g. of 4',2'',4'''-tripropionyl megalomicin in 100 ml. of pyridine, add 5.0 ml. of propionic anhydride and keep the solution at 80°C for 7 days. Concentrate the reaction mixture to a residue under reduced pressure, then dissolve the residue in chloroform. Wash the chloroform solution with 5% aqueous sodium carbonate solution, then with water. Concentrate the chloroform solution under reduced pressure to a residue comprising 3',4',2'',4'''-tetrapropionylmegalomicin A. Purify the residue by chromatography on silica gel using 3% methanolchloroform as the eluant. Combine like fractions on the basis of thin layer chromatography on silica gel and concentrate to a residue comprising 3',4',2'',4'''-tetrapropionylmegalomicin A. Purify further by crystallization from acetone-hexane to obtain 3',4',2'',4'''-tetrapropionylmegalomicin A, m.p. 198°–200°C; $[\alpha]D^{25}$ —84° (ethanol); Mass Spectrum M $^+$ 1100.

B. Heat a solution of 500 mg. of 4',2'',4'''-tripropionylmegalomicin A in 0.35 ml. of propionic anhydride and 15 ml. of pyridine at reflux temperature (about 115°C) for 20 hours. Concentrate the solution under reduced pressure to a residue, triturate the residue with 1.5N ammonium hydroxide solution, filter the resultant solid product and wash well with water. Decolorize the solid in refluxing acetone by means of charcoal, filter and crystallize the solid from aqueous acetone to obtain 3',4',2'',4'''-tetrapropionylmegalomicin A. Purify further by recrystallization from acetone-hexane, m.p. 200°–204°C.

C. Dissolve 250 mg. of megalomicin A in 5 ml. of pyridine, add 0.5 ml. of propionic anhydride and keep the solution at 80°C for 7 days. Isolate and purify the resultant product in a manner similar to that described in Example 1A to obtain 3',4',2'',4'''-tetrapropionylmegalomicin A.

EXAMPLE 2

3',4',2'',4'''-Tetraacetylmegalomicin A

A. Add 2.0 ml. of acetic anhydride to a solution of 1.0 g. of megalomicin A in 25 ml. of pyridine. Keep the solution at 80°C for 1 day, then isolate and purify the resultant product via chromatographic techniques in a manner similar to that described in Example 1A to obtain a product comprising 3',4',2'',4'''-tetraacetylmegalomicin A. Purify by crystallization from aqueous acetone to obtain 3',4',2'',4'''-tetraacetylmegalomicin A, m.p. 239°–242°C; Mass Spectrum M $^+$1044.

B. In a manner similar to that described in Example 1B, treat 250 ml. of megalomicin A in pyridine with an excess of acetic anhydride at reflux temperature for 15 hours. Isolate and purify the resultant product in a manner similar to that described to obtain 3',4',2'',4'''-tetraacetylmegalomicin A.

C. Treat 4'-acetylmegalomicin A (i.e. megalomicin B) with acetic anhydride in pyridine at 80°C for 2 days. Isolate and purify the resultant product in a manner similar to that described in Example 1A to obtain 3',4',2'',4'''-tetraacetylmegalomicin A.

D. To 1 g. of 3',4'-diacetylmegalomicin A (i.e. megalomicin $C_1$) in 25 ml. of pyridine, add 2.0 ml. of acetic anhydride. Keep the solution at room temperature overnight. Isolate and purify the resultant product in a manner similar to that described in Example 2A, to obtain 3',4',2'',4'''-tetraacetylmegalomicin A.

EXAMPLE 3

3',4',2'',4'''-Tetraisovalerylmegalomicin A

A. To a solution of 2.0 g. of megalomicin A in 50 ml. of pyridine add 8.0 ml. of isovaleric anhydride. Keep the reaction mixture at 80°C for 8 days. Isolate the resultant product and purify via chromatography in a manner similar to that described in Example 1A, to obtain 3',4',2'',4'''-tetraisovalerylmegalomicin A. Purify by crystallization from aqueous methanol to obtain 3',4',2'',4'''-tetraisovalerylmegalomicin A, m.p. 117°–121°C; $[\alpha]D^{25}$ - 78° (ethanol).

B. In a manner similar to that described in Example 1B, add an excess of isovaleric anhydride to a solution of megalomicin A in pyridine and heat the reaction mixture at reflux temperature for 30 hours. Isolate and purify the resultant product in a manner similar to that described in Example 1B to obtain 3',4',2'',4'''-tetraisovalerylmegalomicin A.

EXAMPLE 4

3',2'',4'''-Triacetyl-4'-isovalerylmegalomicin A

A. To a solution of 0.5 g. of 4',2'',4'''-triacetylmegalomicin A in 13 ml. of pyridine, add 2 ml. of isovaleric anhydride. Keep the reaction mixture at 80°C for 7 days. Isolate and purify the resultant product in a manner similar to that described in Example 1A. Purify the resultant product by crystallization from aqueous acetone to obtain 3',2'',4'''-triacetyl-4'-isovalerylmegalomicin A, m.p. 175°–180°C; $[\alpha]_D^{25}$ -89° (ethanol); Mass Spectrum M$^+$1086.

B. In a manner similar to that described in Example 1B, dissolve 500 mg. of 4',2'',4'''-triacetylmegalomicin A in 13 ml. of pyridine and add an excess of isovaleric anhydride. Heat the reaction mixture at reflux temperature for 30 hours, then isolate and purify the resultant product in a manner similar to that described to obtain 3',2'',4'''-triacetyl-4'-isovalerylmegalomicin A.

EXAMPLE 5

4'-Acetyl-3',2'',4'''-tripropionylmegalomicin A

A. In a manner similar to that described in Example 1A, but using acetic anhydride in place of propionic anhydride, treat 4',2'',4'''-tripropionylmegalomicin A with acetic anhydride in pyridine at 80°C for 7 days. Isolate and purify the resultant product in a manner similar to that described to obtain 4'-acetyl-3',2'',4'''-tripropionylmegalomicin A, m.p. 209°–212°C; $[\alpha]_D^{25}$ -82° (ethanol); Mass Spectrum $M^+1086$.

B. In a manner similar to that described in Example 1B, treat 4',2'',4'''-tripropionylmegalomicin A in pyridine with an excess of acetic anhydride at reflux temperature for 15 hours. Isolate and purify the resultant product in a manner similar to that described to obtain 3',2'',4'''-tripropionyl-4'-acetylmegalomicin A.

EXAMPLE 6

3',2'',4'''-Triacetyl-4'-propionylmegalomicin A

A. In a manner similar to that described in Example 1A, treat 4',2'',4'''-triacetylmegalomicin A in pyridine with an excess of propionic anhydride at 80°C for 7 days. Isolate and purify the resultant product similar to that described to obtain 3',2'',4'''-triacetyl-4'-propionylmegalomicin A, m.p. 235°–238°C; $[\alpha]_D$ -87° (ethanol); Mass Spectrum $M^+1058$.

B. In a manner similar to that described in Example 1B, heat at reflux temperature for 20 hours a solution of 4',2'',4'''-triacetylmegalomicin A in pyridine to which has been added an excess of propionic anhydride. Isolate and purify the resultant product in a manner similar to that described to obtain 3',2'',4'''-triacetyl-4'-propionylmegalomicin A.

C. The products of Example 6A and 6B are each identical to 3',2'',4'''-triacetyl-4'-propionylmegalomicin A prepared by acetylation of megalomicin $C_2$ (i.e. 3'-acetyl-4'-propionylmegalomicin A) with acetic anhydride in pyridine at room temperature overnight.

EXAMPLE 7

3',2'',4'''-Tribenzoyl-4'-propionylmegalomicin A

Heat a solution of 1.0 g. of 4',2'',4'''-tribenzoylmegalomicin A and 1 ml. of propionic anhydride in 20 ml. of pyridine at 80°C for 7 days. Concentrate the reaction mixture to a residue under reduced pressure, then triturate the residue with 5% ammonium hydroxide solution. Filter the resultant solid product and purify by chromatography on silica gel using 3% methanolchloroform as eluant. Combine like fractions on the basis of thin layer chromatography and evaporate the combined fractions to a residue comprising 3',-2'',4'''-tribenzoyl-4'-propionylmegalomicin A. Purify by crystallization from aqueous methanol; m.p. 166°–169°C; $[\alpha]_D^{25}$ -69° (ethanol).

EXAMPLE 8

3',4'-Diloweralkanoylmegalomicin A

A. 3',4',-Dipropionylmegalomicin A — To a solution of 200 mg. of 3',4',2'',4'''-tetrapropionylmegalomicin A in 5 ml. of methanol add 0.4 ml. of 1N potassium bicarbonate solution and 2 ml. of water. Allow the reaction mixture to stand at room temperature for 5 days, then concentrate to a residue under a stream of nitrogen. Triturate the residue with water and isolate by filtration the resultant solid comprising 3',4'-dipropionylmegalomicin A. Purify by chromtography on silica gel, eluting with 16% methanol in chloroform. Combine like fractions on the basis of thin layer chromatography on silica gel, then crystallize the residue of the combined fractions from aqueous acetone to obtain 3',4'-dipropionylmegalomicin A, m.p. 138°–142°C; Mass Spectrum $M^+977$.

B. Treat 3',4',2'',4'''-tetraisovalerylmegalomicin A with aqueous potassium bicarbonate in methanol in a method similar to that described in above Example 8A. Isolate and purify the resultant product in a manner similar to that described, to obtain 3',4'-diisovalerylmegalomicin A.

EXAMPLE 9

4'-Acetyl-3'-propionylmegalomicin A

Dissolve 25 mg. of 4'-acetyl-3',2'',4'''-tripropionylmegalomicin A in 3 ml. of methanol. Allow the solution to stand at room temperature for 8 days. Concentrate the solution to a residue under a stream of nitrogen and crystallize the residue from aqueous acetone to obtain 4'-acetyl-3'-propionylmegalomicin A, m.p. 140°–145°C; Mass Spectrum $M^+974$.

In similar manner, dissolve 4'-acetyl-3',2'',4'''-triisovalerylmegalomicin A in methanol and allow the solution to stand at room temperature for 8 days. Isolate and purify the resultant product in a manner similar to that described above to obtain 4'-acetyl-3'-isovalerylmegalomicin A.

EXAMPLE 10

3',4'-Diacetylmegalomicin A (Megalomicin $C_1$)

Dissolve 100 mg. of 3',4',2'',4'''-tetraacetylmegalomicin A in 1.4 ml. of methanol. Add 0.15 ml. of water and allow the solution to stand at room temperature for 5 days. Concentrate the reaction mixture under a stream of nitrogen to a residue comprising 3',4'-diacetylmegalomicin A. Purify by crystallization from aqueous acetone to obtain 3',4'-diacetylmegalomicin A, m.p. 236°–238°C; Mass Spectrum $M^+960$ Similarly, this reaction may be carried out using 85% aqueous ethanol (1.5 ml.) instead of methanol/water, allowing the reaction solution to stand at room temperature for 7 days.

The compound prepared in a manner described hereinabove is identical to megalomicin $C_1$ produced by the cultivation under submerged aerobic conditions of *Micromonospora megalomicea*, followed by the separation of the components according to known procedures.

EXAMPLE 11

3'-Acetyl-4'-Propionylmegalomicin A (Megalomicin $C_2$)

A. Dissolve 6.9 g. of 3',2'',4'''-triacetyl-4'-propionylmegalomicin A in 175 ml. of methanol and add 14 ml. of 1N potassium bicarbonate solution and 41 ml. of water. Allow the solution to stand at room temperature for 2 days. Concentrate the reaction mixture in vacuo to a small volume, add water with stirring, then isolate the resultant crystalline material by filtration. Wash the crystalline residue with dilute aqueous methanol and dry, to obtain 3'-acetyl-4'- propionylmegalomicin A, m.p. 145°–147°C; Mass Spectrum M 974.

B. Dissolve 50 mg. of 3',2'',4'''-triacetyl-4ʻ-propionylmegalomicin A in 1 ml. of methanol, keep at room temperature for 7 days then evaporate the methanol under a stream of nitrogen. Triturate the resultant residue with water to obtain 3'-acetyl-4'-propionylmegalomicin A.

C. Dissolve 100 mg. of 3',2'',4'''-triacetyl-4'-propionylmegalomicin A in 4 ml. of 1N methanolic ammonium hydroxide. Allow the solution to stand at room temperature for 5 days, concentrate under nitrogen to a residue, then purify the residue by chromatography on silica gel, eluting with 16% methanol in chloroform. Evaporate combined, like fractions to a residue comprising 3'-acetyl-4'-propionylmegalomicin A.

The 3'-acetyl-4'-propionylmegalomicin A prepared according to procedures 11A, 11B and 11C are identical to megalomicin $C_2$ obtained by cultivation under submerged aerobic conditions of *Micromonospora megalomicea* followed by separation of the components according to known procedures.

D. Alternatively, 3',2'',4'''-triacetyl-4'-propionylmegalomicin A is hydrolyzed to 3'-acetyl-4'-propionylmegalomicin A utilizing reaction conditions set forth in the table below:

| Reactants | Reaction Time | Temperature |
|---|---|---|
| Methanol:water 8:2 | 24 hours | 65°C |
| 10% Sodium carbonate in 50% methanol - water | 4 days | 25°C |
| 10% Ammonia in methanol | 4 days | 25°C |
| Methanol - trace p-toluenesulfonic acid | 7 days | 25°C |

EXAMPLE 12

3'-Benzoyl-4'-propionylmegalomicin A

Dissolve 200 mg. of 3',2'',4'''-tribenzoyl-4'-propionylmegalomicin A in 6 ml. of methanol. Add 2 ml. of water and heat the solution at reflux temperature for 24 hours. Concentrate the solution to a residue under reduced pressure and purify the residue by chromatography on silica gel using 3% methanol in chloroform as the eluant. Combine like fractions on the basis of thin layer chromatography and evaporate the combined fractions to a residue comprising 3'-benzoyl-4'-propionylmegalomicin A, m.p. 87°–92°C; $\lambda_{max}^{CH_3OH}$ 228 mμ (ε13,600).

EXAMPLE 13

3',4',2'',4'''-Tetrapropionylmegalomicin A ditartrate salt

To a solution of 100 mg. of 3',4',2'',4'''-tetrapropionylmegalomicin A. in 10 ml. of ether at room temperature, add dropwise with stirring a saturated solution of tartaric acid in absolute ethanol until no further precipitation occurs. Stir the suspension briefly, filter and wash the precipitate with ether and dry in vacuo at room temperature to obtain 3',4',2'',4'''-tetrapropionylmegalomicin A ditartrate salt, m.p. 127°–130°C; $[\alpha]_D^{25}$ -58° (ethanol).

In similar manner, treat each of the megalomicin A ester derivatives prepared in preceding Examples 2–12 with tartaric acid in ethanol to obtain the corresponding ditartrate salt i.e.

3',4',2'',4'''-tetraacetylmegalomicin A ditartrate salt,
3',4',2'',4'''-tetraisovalerylmegalomicin A ditartrate salt,
3',2'',4'''-triacetyl-4'-isovalerylmegalomicin A ditartrate salt,
3',2'',4'''-tripropionyl-4'-acetylmegalomicin A ditartrate salt,
3',2'',4'''-triacetyl-4'-propionylmegalomicin A ditartrate salt,
3',2'',4'''-tribenzoyl-4'-propionylmegalomicin A ditartrate salt,
3',4'-dipropionylmegalomicin A ditartrate salt,
3',4'-diisovalerylmegalomicin A ditartrate salt,
4'-acetyl-3'-propionylmegalomicin A ditartrate salt,
4'-acetyl-3'-isovalerylmegalomicin A ditartrate salt,
3',4'-diacetylmegalomicin A ditartrate salt,
3'-acetyl-4'propionylmegalomicin A ditartrate salt,
3'-benzoyl-4'-propionylmegalomicin A ditartrate salt.

EXAMPLE 14

3',4'-Dipropionylmegalomicin A bis-potassium dihydrogen phosphate salt

Stir a mixture of 50 mg. of 3',4'-dipropionylmegalomicin A and 16 mg. of potassium dihydrogen phosphate in 5 ml. of water for 30 minutes. Lyophilize the resultant solution to a residue comprising 3',4'-dipropionylmegalomicin A bis-potassium dihydrogen phosphate salt, m.p. 142°–145°C, $[\alpha]_D^{25}$-64° (water).

In similar manner, treat each of the megalomicin A tertiary esters prepared in preceding Examples 1–12 to obtain the corresponding bis-potassium dihydrogen phosphate salt, i.e.

3',4',2'',4'''-tetrapropionylmegalomicin A bis-potassium dihydrogen phosphate salt,
3',4',2'',4'''-tetraacetylmegalomicin A bis-potassium dihydrogen phosphate salt,
3',4',2'',4'''-tetraisovalerylmegalomicin A bis-potassium dihydrogen phosphate salt,
3',2'',4'''-triacetyl-4'-isovalerylmegalomicin A bis-potassium dihydrogen phosphate salt,
3',2'',4'''-tripropionyl-4'-acetylmegalomicin A bis-potassium dihydrogen phosphate salt,
3',2'',4'''-triacetyl-4'-propionylmegalomicin A bis-potassium dihydrogen phosphate salt,
3',2'',4'''-tribenzoyl-4'-propionylmegalomicin A bis-potassium dihydrogen phosphate salt,
3',4'-diisovalerylmegalomicin A bis-potassium dihydrogen phosphate salt,
4'-acetyl-3'-propionylmegalomicin A bis-potassium dihydrogen phosphate salt,
4'-acetyl-3'-isovalerylmegalomicin A bis-potassium dihydrogen phosphate salt,
3',4'-diacetylmegalomicin A bis-potassium dihydrogen phosphate salt,
3'-acetyl-4'-propionylmegalomicin A bis-potassium dihydrogen phosphate salt,
3'-benzoyl-4'-propionylmegalomicin A bis-potassium dihydrogen phosphate salt.

EXAMPLE 15

3',4'-Dipropionylmegalomicin A dilauryl sulfate salt

To 2.5 g. of 3',4'-dipropionylmegalomicin A in 30 ml. of acetone, add 1.5 g. of sodium lauryl sulfate in 25 ml. of water. Add 0.4 ml. of acetic acid in 3 ml. of water while stirring the reaction mixture. Add water to precipitate the desired salt and continue until no further precipitation is noted. Keep the reaction mixture refrigerated overnight, decant the supernatant liquid, dissolve the oily residue in acetone and pour the organic acetone solution into excess ether. Refrigerate ethereal solution overnight, then decant the ether solution from oily precipitate; dissolve the oily precipitate in acetone and concentrate the solution in vacuo to a residue comprising 3',4'-dipropionylmegalomicin A dilauryl sulfate salt. Yield, 3.0 g.; m.p. 109°–114°C.

EXAMPLE 16

3',4',2'',4'''-Tetrapropionylmegalomicin A dilauryl sulfate salt

Add 1.4 g. of sodium lauryl sulfate in 25 ml. of water to a solution of 2.5 g. of 3',4',2'',4'''-tetrapropionylmegalomicin A in 30 ml. of acetone. Add 0.4 ml. of acetic acid in 3 ml. of water to the reaction mixture with stirring. Add water to the reaction mixture until there is no further precipitation and refrigerate for about 3.5 hours. Decant the supernatant liquid, dissolve the oily residue in acetone and pour the acetone solution into ether. Refrigerate the ethereal solution for two hours, decant the ether solution and triturate the residual semicrystalline precipitate with ether. Filter the resulting crystalline solid, wash with ether and air dry to obtain 3',4',2'',4'''-tetrapropionylmegalomicin A dilauryl sulfate salt. Yield, 1.9 g.; m.p. 100°–104°C.

EXAMPLE 17

3',2'',4'''-Tripropionyl-4'-capryloylmegalomicin A

3',2'',4'''-Tripropionyl-4'-caproylmegalomicin A

3',2'',4'''-Tripropionyl-4'-stearoylmegalomicin A

In a manner similar to that described in Example 1B, treat 4',2'',4'''-tripropionylmegalomicin A in pyridine at reflux temperature for about 30 hours with each of the following acid anhydrides: caprylic anhydride, caproic anhydride, and stearic anhydride. Isolate and purify each of the respective resultant products in a manner similar to that described in Example 1B to obtain respectively 3',2'',4'''-tripropionyl-4'-capryloylmegalomicin A, 3',2'',4'''-tripropionyl-4'-caproylmegalomicin A, and 3',2'',4'''-tripropionyl-4-stearoylmegalomicin A.

EXAMPLE 18

3'-Propionyl-4'-capryloylmegalomicin A

3'-Propionyl-4'-caproylmegalomicin A

3'-Propionyl-4'-stearoylmegalomicin A

In a manner similar to that described in 8A, treat each of the 3',2'',4'''-tripropionyl-4'-acylmegalomicin A esters prepared in Example 17 with potassium bicarbonate solution in aqueous methanol. Isolate and purify the resultant respective products in a manner similar to that described in Example 1A to obtain respectively 3'-propionyl-4'-capryloylmegalomicin A, 3'-propionyl-4'-caproylmegalomicin A, and 3'-propionyl-4'-stearoylmegalomicin A.

EXAMPLE 19

3',4',4'''-Triacylmegalomicin A

A. 3',4',4'''-Tripropionylmegalomicin A

Dissolve 500 mg. of 3',4',2'',4'''-tetrapropionylmegalomicin A in 250 ml. of methanol and add a trace (i.e. less than 1 mg.) of p-toluenesulfonic acid. Heat the reaction mixture at reflux temperature for about one hour following the course of the reaction by taking thin layer chromatograms of aliquots of the reaction mixture at intervals, stopping the reaction when the chromatogram indicates that the 3',4',4'''-tripropionylmegalomicin A thereby formed is being hydrolyzed to the 3',4'-dipropionyl ester. Pass the reaction mixture down a short bed of Amberlite IR 45 (or any other suitable anion exchange resin). Evaporate the eluate and purify the resultant residue via preparative thin layer chromatography on silica gel using 20% methanol in chloroform as an eluent to give 3',4',4'''-tripropionylmegalomicin A.

B. In similar manner treat each of the following tetraacyl derivatives of megalomicin A in methanol and in the presence of p-toluenesulfonic acid at reflux temperature:

3',4',2'',4'''-tetraisovalerylmegalomicin A,
3',2'',4'''-triacetyl-4'-isovalerylmegalomicin A,
4'-acetyl-3',2'',4'''-tripropionylmegalomicin A,
3',2'',4'''-triacetyl-4'-propionylmegalomicin A,
3',2'',4'''-tribenzoyl-4'-propionylmegalomicin A.
4'-capryloyl-3',2'',4'''-tripropionylmegalomicin A,
4'-caproyl-3',2'',4'''-tripropionylmegalomicin A,
4'-stearoyl-3',2'',4'''-tripropionylmegalomicin A.

Isolate and purify the resultant respective products in a manner similar to that described in Example 19A to obtain, respectively, 3',4',4'''-triisovalerylmegalomicin A,
3',4'''-diacetyl-4'-isovalerylmegalomicin A,
4'-acetyl-3',4'''-dipropionylmegalomicin A,
3',4'''-diacetyl-4'-propionylmegalomicin A,
3',4'''-dibenzoyl-4'-propionylmegalomicin A,
4'-capryloyl-3',4'''-dipropionylmegalomicin A,
4'-caproyl-3',4'''-dipropionylmegalomicin A,
3',4'''-dipropionyl-4'-stearoylmegalomicin A.

EXAMPLE 20

3',4',2''-Triacylmegalomicin A

A. 3',4',2''-Tripropionylmegalomicin A

To a solution of 1.0 g. of 3',4'-dipropionylmegalomicin A in 5 ml. of acetone, add 0.2 ml. of propionic acid anhydride (i.e. about one molar equivalent). Stir the solution at room temperature for 4 hours, then add about 8 ml. of 1.2% ammonium hydroxide with stirring. Filter the resultant precipitate, wash the precipitate with dilute aqueous acetone and then with water and dry. Recrystallize the dried precipitate from aqueous acetone to obtain 3',4',2''-tripropionylmegalomicin A.

B. By following the procedure of Example 20A but substituting for propionic acid anhydride an equivalent quantity of other acid anhydrides such as acetic anhydride, butyric anhydride, valeric anhydride, caproic anhydride, caprylic anhydride, stearic anhydride, there is obtained the corresponding 3',4'-dipropionyl-2''-acylmegalomicin A, i.e. 2''-acetyl-3',4'-dipropionylmegalomicin A, 2''-butyryl-3',4'-dipropionylmegalomicin A, 3',4'-dipropionyl-2''-valerylmegalomicin A, 2''-caproyl-3',4'-dipropionylmegalomicin A, 2''-capryloyl-3',4'-dipropionylmegalomicin A, 2''-stearoyl-3',4'-dipropionylmegalomicin A, respectively.

C. In a manner similar to that described in Example 20A, treat each of the following 3',4'-diacyl derivatives of megalomicin A with propionic anhydride in acetone:
 4'-acetyl-3'-propionylmegalomicin A,
 3'-benzoyl-4'-propionylmegalomicin A,
 4'-capryloyl-3'-propionylmegalomicin A,
 4'-caproyl-3'-propionylmegalomicin A, and
 3'-propionyl-4'-stearoylmegalomicin A.
Isolate and purify the resultant respective products in a manner similar to that described in Example 20A to obtain, respectively,
 4'-acetyl-3',2''-dipropionylmegalomicin A,
 3'-benzoyl-4',2''-dipropionylmegalomicin A,
 4'-capryloyl-3',2''-dipropionylmegalomicin A,
 4'-caproyl-3',2''-dipropionylmegalomicin A, and
 3',2''-dipropionyl-4'-stearoylmegalomicin A.

EXAMPLE 21

Mixed 3',4',2'',4'''-Tetraacylmegalomicin A Esters

A.

1. To a solution of 10 g. of 3',4'-dipropionylmegalomicin A in 50 ml. of pyridine, add 50 ml. of acetic anhydride. Keep the reaction mixture at room temperature for 18 hours, then pour the solution into 2 l. of ice water and add 50 ml. of 14% ammonium hydroxide. Filter the resultant precipitate, wash with water and air dry. Purify by dissolving the precipitate in acetone, treating the acetone solution with decolorizing carbon and crystallizing by adding water. Filter the resultant precipitate and dry to obtain 2'',4'''-diacetyl-3',4'-dipropionylmegalomicin A.

2. Alternatively, the compound of this example is isolated and purified as follows: concentrate the reaction mixture in vacuo at a temperature below 40°C to a residue. Dissolve the residue in acetone and dilute the acetone solution slowly with 5% ammonium hydroxide. Filter the resultant precipitate and recrystallize from aqueous acetone to obtain 2'',4'''-diacetyl-3',4'-dipropionylmegalomicin A.

3. In the foregoing procedures, the mixed tetraacyl ester may also be extracted with methylene chloride from the aqueous phase after the addition of 5% ammonium hydroxide. Wash the methylene chloride extracts with water, concentrate to a residue in vacuo and crystallize the residue from aqueous acetone to obtain 2'',4'''-diacetyl-3',4'-dipropionylmegalomicin A.

4. In a manner similar to that described hereinabove, treat each of 3'-benzoyl-4'-propionylmegalomicin A and 4'-acetyl-3'-propionylmegalomicin A with acetic anhydride in pyridine at room temperature for 18 hours. Isolate and purify the resultant respective products in a manner similar to that described hereinabove to obtain, respectively, 2'',4'''-diacetyl-3'-benzoyl-4'-propionylmegalomicin A and 4',2'',4'''-triacetyl-3'-propionylmegalomicin A.

B.

1. To a solution of 3',4'-dipropionylmegalomicin A in 5 ml. of pyridine, add 0.14 ml. of benzoyl chloride with stirring. Allow the solution to stand at room temperature overnight, then concentrate in vacuo to a volume of about 1 ml. Dilute the residue with 5 ml. of acetone and add 5% ammonium hydroxide until there is no further precipitation. Filter the resultant precipitate, wash with water, and dry to obtain 2'',4'''-dibenzoyl-3',4'-dipropionylmegalomicin A.

2. In a similar manner treat 4'-acetyl-3'-propionylmegalomicin A with benzoyl chloride in pyridine. Isolate and purify the resultant product in a manner similar to that described to obtain 4'-acetyl-2'',4'''-dibenzoyl-3'-propionylmegalomicin A.

C.

In a manner similar to that described in Example 21A, treat each of the following with acetic anhydride in pyridine at room temperature for 18 hours:
 3',4',4'''-tripropionylmegalomicin A,
 3',4'''-dibenzoyl-4'-propionylmegalomicin A,
 3',4',2''-tripropionylmegalomicin A,
 4'-acetyl-3',2''-dipropionylmegalomicin A, and
 3',2''-dipropionyl-4'-caproylmegalomicin A.
Isolate and purify the resultant respective products in a manner similar to that described in above Example 21A to obtain, respectively,
 2''-acetyl-3',4',4'''-tripropionylmegalomicin A,
 2''-acetyl-3',4'''-dibenzoyl-4'-propionylmegalomicin A,
 4'''-acetyl-3',4',2''-tripropionylmegalomicin A,
 4',4'''-diacetyl-3',2''-dipropionylmegalomicin A, and
 4'''-acetyl-4'-caproyl-3',2''-dipropionylmegalomicin A.

EXAMPLE 22

Other Mixed 3',4',2'',4'''-Tetraacylmegalomicin A Esters

A. 4',2'',4'''-Triacylmegalomicin A

To a solution of 10.0 g. of megalomicin A in 200 ml. of pyridine, add 20 ml. of propionic anhydride and allow the reaction mixture to stand at room temperature for 18 hours. Pour the solution into 2 l. of ice water, add 50 ml. of 14% ammonium hydroxide and filter; wash with water and dry the resultant precipitate comprising 4',2'',4'''-tripropionylmegalomicin A. Purify by dissolving the tripropionylmegalomicin A in acetone, treating the acetone solution with decolorizing carbon and crystallizing from aqueous acetone to obtain 4',2'',4'''-tripropionylmegalomicin A, m.p. 177°–179°C [α]$_D$ – 77° (Ethanol).

In a similar manner esterify megalomicin A according to the above procedure using acetic anhydride instead of propionic anhydride. Isolate and purify the resultant product in a manner similar to that described hereinabove to obtain 4',2'',4'''-triacetylmegalomicin A, m.p. 199°–202°C, [α]$_D$ – 86° (Ethanol).

B. 4'-Acylmegalomicin A

Heat a solution of 500 mg. of 4',2'',4'''-tripropionylmegalomicin A in 20 ml. of 80% aqueous methanol on a steam bath for 6 hours. Concentrate the solution under reduced pressure to a residue and crystallize the residue from aqueous acetone to obtain 4'-propionylmegalomicin A, m.p. 203°–207°C, which exhibits antibacterial activity in vitro against gram positive and gram negative organisms, but is valuable mainly as an intermediate for the process of this invention as disclosed in following procedures 22C–22F.

In similar manner, other 4'-mono esters of megalomicin A are prepared by selective cleavage of 4',2'',4'''-triesters of megalomicin A. Thus, when 4',2'',4'''-triacetyl megalomicin A is treated with aqueous methanol in the above described manner there is obtained 4'-acetylmegalomicin A.

C. 3',4',2'',4'''-Tetraacylmegalomicin A

23

In a manner similar to that described in Example 3A, treat 2 g. of each of 4'-propionylmegalomicin A and 4'-acetylmegalomicin A with 8 ml. of isovaleric anhydride at 80°C for 8 days. Isolate and purify each of the resultant products in a manner similar to that described in Example 3A to obtain, respectively, 3'-propionyl-4',2'',4'''-triisovalerylmegalomicin A, and 3'-acetyl-4',2'',4'''-triisovalerylmegalomicin A.

D. 3',4'-Diacylmegalomicin A

Hydrolyze each of 3'-propionyl-4',2'',4'''-triisovalerylmegalomicin A and 3'-acetyl-4',2'',4'''-triisovalerylmegalomicin A in a manner similar to that described in Example 8A with potassium bicarbonate solution in water and methanol. Isolate and purify each of the resultant products in a manner similar to that described in Example 8A to obtain, respectively, 3'-propionyl-4'-isovalerylmegalomicin A, and 3'-acetyl-4'-isovalerylmegalomicin A.

E. 3',4',2''-Triacylmegalomicin A

In a manner similar to that described in Example 20A, treat each of 3'-propionyl-4'-isovalerylmegalomicin A and 3'-acetyl-4'-isovalerylmegalomicin A in acetone with a molar equivalent of caproic anhydride. Isolate and purify each of the respective resultant products in a manner similar to that described to obtain, respectively, 2''-caproyl-3'-propionyl-4'-isovalerylmegalomicin A, and 3'-acetyl-2''-caproyl-4'-isovalerylmegalomicin A.

F. 3',4',2'',4'''-Tetraacylmegalomicin A

In a manner similar to that described in Example 20A, treat each of 2''-caproyl-3'-propionyl-4'-isovalerylmegalomicin A, and 3'-acetyl-2''-caproyl-4'-isovalerylmegalomicin A in acetone with a molar equivalent of butyric anhydride at room temperature for about 4 hours. Isolate and purify the respective resultant products in a manner similar to that described in Example 20A to obtain, respectively, 4'''-butyryl-2''-caproyl-3'-propionyl-4'-isovalerylmegalomicin A, and 3'-acetyl-4'''-butyryl-2''-caproyl-4'-isovalerylmegalomicin A.

The following examples are typical of some of the pharmaceutical dosage forms wherein the megalomicin A esters of this invention may be used. Other formulations will be obvious to those skilled in the art. The formulations are designed to permit the administration of from about 5 to about 50 mg. per day of megalomicin A ester per kiolgram body weight, it being understood that the dosage given and frequency of administration depends on the type, stage and severity of infection, and upon the age and individual characteristics of the animal species being treated. It is contemplated that the medicaments may be given in doses up to 8 times in a 24-hour period.

EXAMPLE 23

Capsule:
| | |
|---|---|
| 3',4'-Dipropionylmegalomicin A | 250.00 mg. |
| Lactose | 248.75 mg. |
| Magnesium Stearate | 1.25 mg. |
| | 500.00 mg. |

Procedure:
1. Blend the 3',4'-dipropionylmegalomicin A and the lactose
2. Add the magnesium stearate and mix
3. Fill capsules

24

EXAMPLE 24

Oral Suspension (to give a dose of 125 mg. per 5 ml.):
| | |
|---|---|
| 3',4'-Dipropionylmegalomicin A | 25.0 gm. |
| Magnesium aluminum silicate | 9.5 gm. |
| Sodium Carboxymethylcellulose, U.S.P. | 2.5 gm. |
| Sodium Citrate, U.S.P. | 25.0 gm. |
| Flavor | q.s. |
| Color | q.s. |
| Methylparaben, U.S.P. | 0.9 gm. |
| Propylparaben, U.S.P. | 0.2 gm. |
| Polysorbate 80, U.S.P. | 1.0 gm. |
| Sorbitol Solution, U.S.P. | 500.0 gm. |
| Water q.s. | 1000.0 ml. |

Procedure:
1. Heat 200 ml. of water to boiling, and dissolve in it one half of the parabens. Cool to about 70°C, then mix in the Polysorbate 80. Sprinkle in the silicate, stirring until a uniform smooth suspension results.
2. Heat an additional 200 ml. of water to boiling, and dissolve in it the remainder of the parabens. Disperse the sodium carboxymethylcellulose in this until a smooth gel results. Mix in the Sorbitol Solution. Then dissolve the sodium citrate.
3. Add 2 to 1 slowly, with constant stirring. Cool the mixture to 25°C. Add the 3',4'-dipropionylmegalomicin A, flavor and color, mixing thoroughly. Add sufficient quantity of water to make the total volume 1000 ml.

EXAMPLE 25

Parenteral Suspension:
| | |
|---|---|
| 3',4',2'',4'''-tetrapropionylmegalomicin A | 250 mg. |
| Sodium Carboxymethylcellulose | 3 mg. |
| Polysorbate 80 USP | 1 mg. |
| Methylparaben | 3.6 mg. |
| Propylparaben | 0.4 mg. |
| Water q.s. | 2.0 ml. |

Procedure:
1. Prepare a solution of sodium carboxymethylcellulose, Polysorbate 80, USP, methylparaben, and propylparaben. Autoclave the solution.
2. Aseptically, slurry sterile 3',4',2'',4'''-tetrapropionylmegalomicin A with a portion of the above vehicle and pass through a colloid mill.
3. Mix the milled slurry with the remainder of the vehicle.
4. Fill into sterile vials.

We claim:

1. A process which comprises treating a 3'-hydroxymegalomicin A starting compound selected from the group consisting of megalomicin A, 4'-monoacylmegalomicin A, 2'',4'''-diacylmegalomicin A and 4',2'',4'''-triacylmegalomicin A, each of said acyl radicals being derived from a hydrocarbon carboxylic acid having from 2 to 18 carbon atoms, with an excess of an acid anhydride of a hydrocarbon carboxylic acid having from 2 to 18 carbon atoms in a basic medium at a temperature in the range of from about 60° to about 120°C, whereby is formed a 3',4',2'',4'''-tetraacyl ester derivative of megalomicin A having the following structural formula:

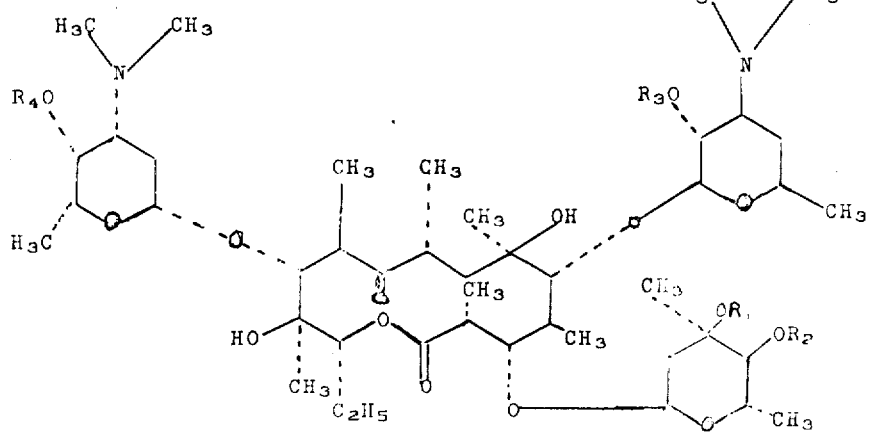

wherein $R_1$, $R_2$, $R_3$ and $R_4$ are each an acyl radical of a hydrocarbon carboxylic acid having from 2 to 18 carbon atoms and wherein, when said 3'-hydroxymegalomicin A starting compound also has a 4'-acyl derivative, $R_2$ is the acyl radical of said acid anhydride reagent and $R_1$ is the acyl radical originally in the 4'-position of the 3'-hydroxy-4'-acylmegalomicin A starting compound.

2. The process according to claim 1 wherein said basic medium is pyridine, said acid anhdyride is an acid anhydride of a lower alkanoic acid having up to 8 carbon atoms, and wherein said reaction temperature is about 115°C.

3. The process according to claim 1 when said acid anhydride is propionic anhydride, said basic medium is pyridine, said reaction temperature is about 115°C, and said 3'-hydroxymegalomicin A starting compound is megalomicin A, whereby is formed 3',4',2'',4'''-tetrapropionylmegalomicin A.

4. The process of claim 1 including the added step of subjecting to mild non-acidic hydrolytic conditions the 3',4',2'',4'''-tetraacylmegalomicin A, and isolating the 3',4'-diacylmegalomicin A thereby formed having the following structural formula:

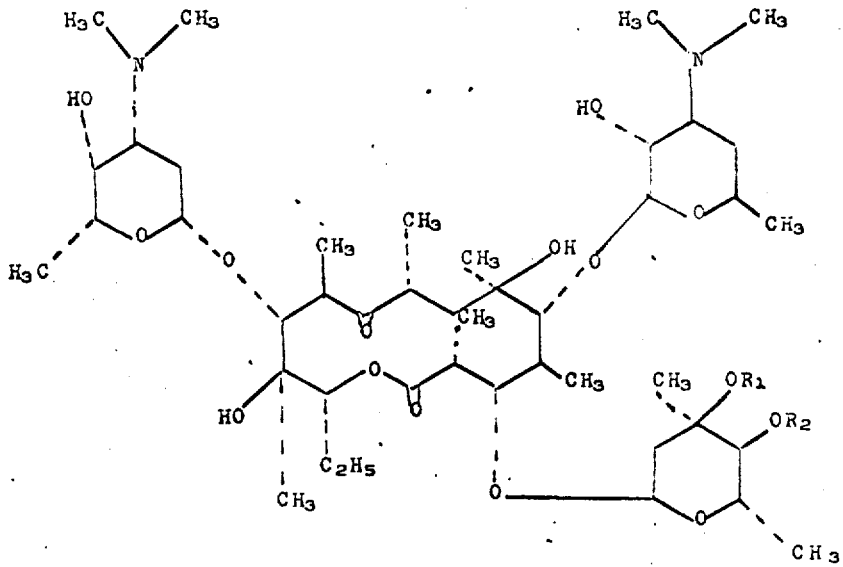

wherein $R_1$ and $R_2$ are each an acyl radical of a hydrocarbon carboxylic acid having from 2 to 18 carbon atoms.

5. A process according to claim 4 wherein said megalomicin A ester derivative is 3',4',2'',4'''-tetrapropionylmegalomicin A and wherein said mild non-acidic hydrolytic conditions comprise treating said 3',4',2'',4'''-tetrapropionylmegalomicin A with a lower alkanolic-aqueous metal bicarbomate solution at room temperature, whereby is formed 3',4'-dipropionylmegalomicin A.

6. A process according to claim 4 wherein said megalomicin A ester derivative is 3',4',2'',4'''-tetraacylmegalomicin A and wherein said mild non-acidic hydrolytic conditions comprise treating said 3',4',2'',4'''-tetraacylmegalomicin A with a member selected from the group consisting of aqueous lower alkanol, anhydrous lower alkanol and a lower alkanolic aqueous alkali metal bicarbonate solution.

7. A process according to claim 6 wherein said lower alkanol in said mild, non-acidic, hydrolytic conditions is methanol.

8. A process according to claim 1 wherein said 3'-hydroxymegalomicin A starting compound is 4',2'',4'''-triacetylmegalomicin A and wherein said acid anhydride is propionic anhydride, whereby is formed 3',2'',4'''-triacetyl-4'-propionylmegalomicin A, including the added step of hydrolyzing said 3',2'',4'''-triacetyl-4'-propionylmegalomicin A whereby is formed 3'-acetyl-4'-propionylmegalomicin A.

9. A compound selected from the group consisting of 3',4'-diacyl, 3',4',2''-triacyl, 3',4',4'''-triacyl, and 3',4',2'',4'''-tetraacyl derivatives of megalomicin A having the following structural formula:

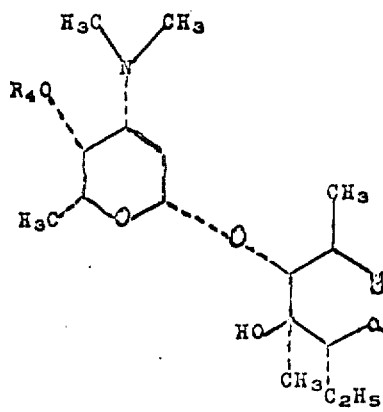
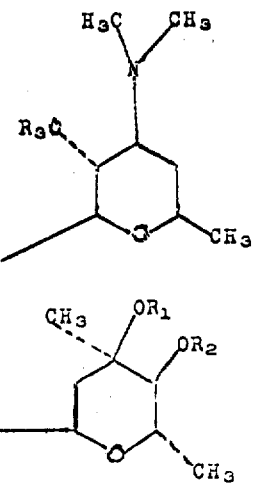

wherein $R_1$ is an acyl radical of a hydrocarbon carboxylic acid having from 2 to 18 carbon atoms;

$R_2$ is an acyl radical of a hydrocarbon carboxylic acid having from 2 to 18 carbon atoms with the proviso that when $R_1$ is acetyl, $R_2$ is an acyl radical having from 4 to 18 carbon atoms; and $R_3$ and $R_4$ are members selected from the group consisting of hydrogen and an acyl radical of a hydrocarbon carboxylic acid having from 2 to 18 carbon atoms;

and the pharmaceutically acceptable acid addition salts thereof.

10. A compound according to claim 9 wherein $R_1$, $R_2$, $R_3$ and $R_4$ are propionyl, said compound being 3',4'-,2'',4'''-tetrapropionylmegalomicin A.

11. A compound according to claim 9, wherein $R_1$ and $R_2$ are propionyl; and $R_3$ and $R_4$ are hydrogen, said compound being 3',4'-dipropionylmegalomicin A.

12. A compound according to claim 9 wherein $R_2$ is acetyl and $R_1$, $R_3$ and $R_4$ are propionyl, said compound being 4'-acetyl-3',2'',4'''-tripropionylmegalomicin A.

13. A compound according to claim 9 wherein $R_1$ is acetyl, $R_2$ is propionyl and $R_3$ and $R_4$ are hydrogen, said compound being 4'-acetyl-3'-propionylmegalomicin A.

14. A compound according to claim 9 wherein said acyl derivatives are derived from lower alkanoic acids having from 2 to 8 carbon atoms.

15. 4'-Propionylmegalomicin A.

* * * * *